April 17, 1945.   G. B. WATKINS   2,374,056
LAMINATED GLASS STRUCTURE AND METHOD OF PRODUCING THE SAME
Filed May 15, 1942

Inventor
GEORGE B. WATKINS.
By
Frank Fraser
Attorney

Patented Apr. 17, 1945

2,374,056

UNITED STATES PATENT OFFICE 2,374,056

LAMINATED GLASS STRUCTURE AND METHOD OF PRODUCING THE SAME

George B. Watkins, Toledo, Ohio, assignor to Libbey-Owens-Ford Glass Company, Toledo, Ohio, a corporation of Ohio Application May 15, 1942, Serial No. 443,046

11 Claims. (Cl. 154—2.71)

The present invention relates to laminated glass structures and to the method of producing the same.

The laminated glass structures to which this invention more particularly relates are of the type comprising two sheets of glass and an interposed layer of thermoplastic adherent thereto, the surface area of the plastic interlayer being greater than the surface area of the glass sheets so that it extends beyond the edges of said sheets to provide a flexible attaching and sealing flange. While the laminated structures of this invention are not restricted to any specific use, they are of especial utility in glazing the openings in airplanes and other aircraft where the requirements are unusually stringent.

The above type of laminated glass structure is adapted to be mounted in the opening to be glazed by clamping the extended portion only of the plastic interlayer in the supporting frame as distinguished from clamping the marginal portions of the glass sheets. By clamping the flexible plastic attaching flange only, the laminated structure has a certain resiliency or freedom of movement relative to the supporting frame whereby torsion and shock to which the plane may be subjected will be "cushioned" and for all practical purposes will not be transmitted directly to the glass, thus reducing or eliminating the tendency of cracking or shattering thereof from such causes. In other words, by so mounting the laminated structure, it is possible to obtain the benefit of the resiliency or ability to give on the part of the plastic so that when the plane is in flight and twists, weaves or is subjected to varied pressure differentials the glass will not tend to break because of its ability to "float" without introduction of localized strains.

This invention has to do with the provision of an improved laminated glass structure of the above character and method of fabricating the same whereby to facilitate the mounting of the structure in a supporting frame in such a way that it can be locked or anchored therein in a positive manner.

Another object of the invention is the provision of an improved laminated glass structure of the above character in which the extended plastic attaching flange is provided in one or both faces thereof with a groove or channel adapted to receive a portion of the supporting frame therein to securely lock or anchor the structure in place.

A further object of the invention is the provision of an improved method of forming the extended plastic attaching flange and more particularly for forming the groove or channel therein to insure the proper locating or positioning of said groove or channel with reference to the portion of the supporting frame to be received therein whereby to facilitate the mounting of said structure in said frame.

Other objects and advantages of the invention will become more apparent during the course of the following description, when taken in connection with the accompanying drawing.

In the drawing, wherein like numerals are employed to designate like parts throughout the same:

Figure 1:
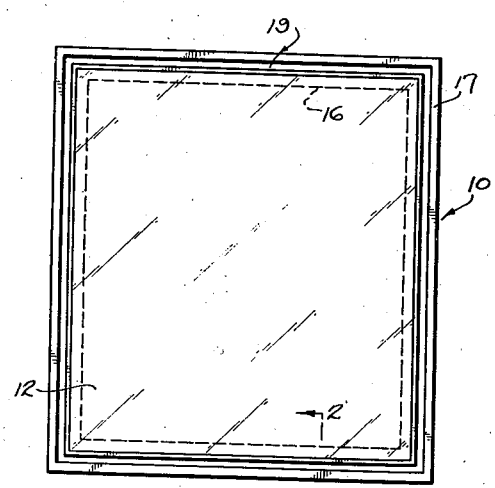
Fig. 1 is a front view of a laminated glass structure made in accordance with the invention.

With reference now to the drawing, the laminated glass structure 10 comprises the two sheets of glass 11 and 12 and an interposed plastic membrane 13 composed of one or a plurality of layers 14 of a suitable plastic material bonded to one another and to the glass sheets to provide a unitary structure. It will be noted that the glass sheets are co-extensive with one another and that the surface area thereof is relatively less than the surface area of the plastic membrane 13 so that the plastic membrane extends beyond the edges of the glass sheets as indicated at 15.

The glass sheets 11 and 12 may consist of ordinary plate or window glass and may be either fully tempered or semi-tempered or any desired combination of glass sheets may be used. Likewise, a sheet of relatively hard plastic material such as "Plexiglas" or "Lucite" may be substituted for either one or both of the glass sheets. The plastic membrane 13 is preferably formed of a synthetic resin material, such as, for example, a suitably plasticized polyvinyl acetal resin.

However, different plastics varying in thickness and physical characteristics may be employed as the invention is not limited to the use of any particular resin, class of resins, cellulosic derivatives or the like. Although not essential to the present invention, it is preferred that reinforcing metal inserts 16 be embedded in the extended plastic 15. These metal inserts may consist of relatively thin strips of preferably flexible metal, such as aluminum, embedded in the extended plastic and projecting for a short distance inwardly of the edges of the glass sheets 11 and 12.

In accordance with the invention, strips of plastic material 17 and 18 are bonded to opposite faces of the extended portion 15 of plastic membrane 13 and cooperate therewith to provide a flexible attaching flange A of substantially the same thickness as the over-all thickness of the laminated structure 10. The facing strips 17 and 18 are of substantially the same thickness as the respective glass sheets and, if desired, can be formed of a plurality of relatively thin layers of plastic bonded together to give a strip of the required thickness. Individual strips of plastic 17 and 18 may be arranged at the four edges of the glass sheets or a single continuous collar may be applied to each face of the extended plastic 15 to encircle the respective glass sheet. The facing strips 17 and 18 can also be formed of a synthetic resin such as a polyvinyl acetal resin, although the invention is not limited to the use of any particular resin, class of resins, cellulosic derivatives or the like.

In fabricating the laminated structure 10 according to one process, the layers of plastic 14 forming the membrane 13 are first placed between the glass sheets 11 and 12 and the plastic facing strips 17 and 18 arranged at the edges of the glass sheets upon opposite faces of the extended plastic 15. The assembled laminations and facing strips are then subjected first to a relatively light initial or preliminary pressing, after which the assembly can be placed in an autoclave and subjected to a final heat and pressure treatment in accordance with the well known procedure of producing laminated safety glass. This will result in the glass sheets and interposed plastic membrane being bonded to one another and the plastic facing strips 17 and 18 being bonded to the extended plastic 15 to form a composite structure. However, if desired, the glass sheets 11 and 12 can first be bonded to the plastic membrane 13, after which the plastic facing strips 18 and 19 can be bonded to the extended portion 15 of the plastic membrane 13.

Figures 2, 3:
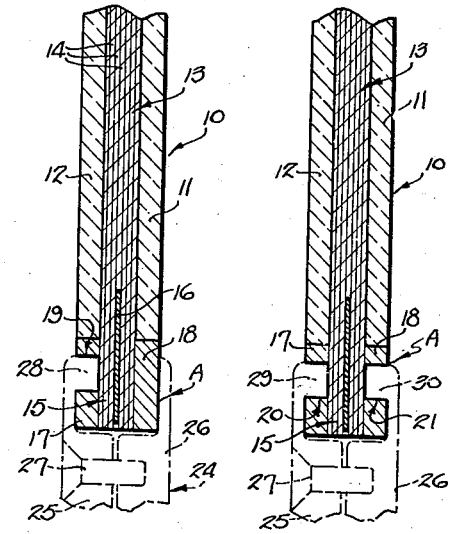
Fig. 2 is a transverse section therethrough taken on line 2—2 of Fig. 1 and showing the structure mounted in a supporting frame indicated in broken lines.
Fig. 3 is a view similar to Fig. 2 but showing an alternative type of structure.
Figure 4:
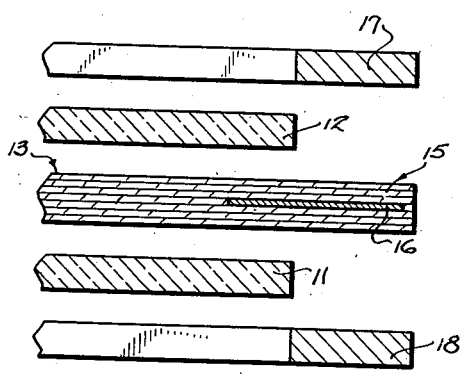
Fig. 4 is a diagrammatic sectional view showing the several laminations to be joined in properly assembled relation with respect to one another.
Figure 5:
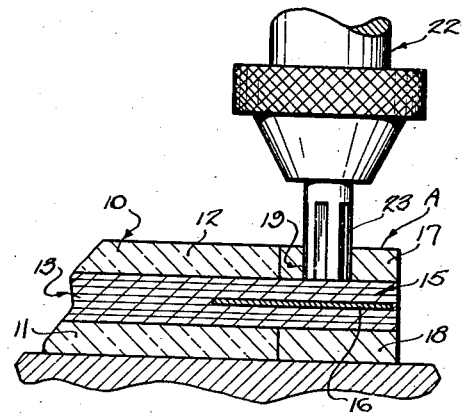
Fig. 5 is a transverse sectional view through the laminated structure illustrating the formation of the channel or groove in the extended plastic attaching flange.
Figure 6:
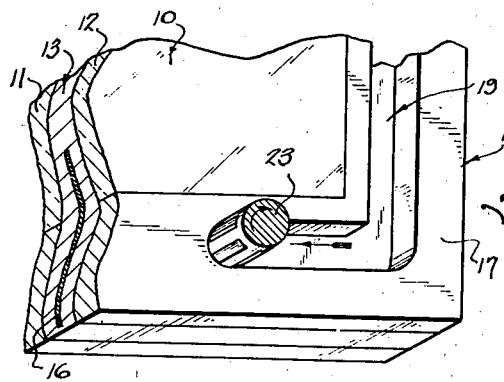
Fig. 6 is a perspective view also illustrating the formation of the channel or groove in the extended plastic.

After the compositing operation, there is provided in one face of the plastic attaching flange A a channel or groove 19 as shown in Figs. 1 and 2, or if desired, grooves or channels 20 and 21 may be provided in opposite faces of the plastic attaching flange as shown in Fig. 3. In either case, the formation of the channel is effected by routing out the desired amount of plastic by the use of a cutting device 22 including a rotary cutting tool 23. The cutting tool 23 rotates about an axis extending perpendicular to the extended plastic attaching flange A and during rotation of the cutting tool the cutting device 22 is simultaneously moved bodily forwardly to effect the formation of a channel of the desired width and depth, as clearly illustrated in Fig. 6.

In mounting the laminated structure 10, the channel or channels formed in the plastic attaching flange are adapted to receive a portion of the supporting frame to effect the locking or anchoring of the laminated structure therein in a positive manner, whereby to effectively prevent accidental or forcible displacement thereof. For instance, in Fig. 2 is shown a supporting frame 24 comprising the outer and inner sections 25 and 26 secured together by screws or the like 27. The plastic attaching flange A is clamped between the frame sections 25 and 26 and the inner frame section 26 is formed with a lateral rib 28 which is received within the channel 19 in the plastic attaching flange. On the other hand, in Fig. 3, the inner and outer frame sections 25 and 26 are provided with ribs 29 and 30 which are received within the channels or grooves 20 and 21 at opposite sides of the attaching flange.

In order to effect the proper mounting of the laminated structure 10 within the supporting frame 24, it is essential that the grooves or channels in the attaching flange be properly located with reference to the portion of the supporting frame to be received therein. This can be readily accomplished by first forming the plastic attaching flange of the same thickness as the laminated structure and then routing out the channel in the manner above described. In fact, this method is much more satisfactory than where the channel or groove is formed in the attaching flange prior to bonding of the laminations together due to shrinkage which occurs in the plastic during the compositing of the laminations.

It is also preferred that the plastic facing strips 17 and 18 be formed of a relatively harder material than the plastic membrane 13. For instance, the plastic membrane 13 may be formed of a polyvinyl butyr acetal resin plasticized with from 15 to 30 parts dibutyl sebacate to 100 parts of resin by weight, while the facing strips 17 and 18 may be formed of a polyvinyl butyr acetal resin plasticized with from 7 to 15 parts dibutyl sebacate per 100 parts of resin by weight. The provision of facing strips of relatively harder plastic is also of advantage in that a more rigid and stronger support is provided for the laminated structure, while at the same time obtaining the benefit of the resiliency and flexibility of the softer plastic membrane.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. The method of fabricating a laminated glass structure including two sheets of glass and an interposed layer of thermoplastic adherent thereto and in which the plastic interlayer extends beyond the edges of the glass sheets, comprising assembling the glass sheets and interposed layer of thermoplastic to form a "sandwich," placing plastic facing strips at opposite sides of the extending portion of the plastic interlayer of a thickness substantially equal to the thickness of the glass sheets and which cooperate with said extended plastic to form an attaching flange, bonding the glass sheets to the plastic interlayer and the plastic facing strips to the extended plastic to form a composite structure, and then forming a channel in one side face of the plastic attaching flange for the reception of a mounting means.

2. A method as set forth in claim 1 characterized by the fact that the formation of the channel in the plastic attaching flange is effected by a cutting operation.

3. The method of fabricating a laminated glass structure including two sheets of glass and an interposed layer of thermoplastic adherent thereto and in which the plastic interlayer extends beyond the edges of the glass sheets, comprising assembling the glass sheets and interposed layer of thermoplastic to form a "sandwich," placing plastic facing strips at opposite sides of the extended portion of the plastic interlayer of a thickness substantially equal to the thickness of the glass sheets and which cooperate with said extended plastic to form an attaching flange, bonding the glass sheets to the plastic interlayer and the plastic facing strips to the extended plastic to form a composite structure, and then routing out a portion of one of said facing strips to form a channel in one side face of the plastic attaching flange for the reception of a mounting means.

4. A method as set forth in claim 3 characterized by the fact that the routing out of the plastic attaching flange is effected by a mechanical cutting operation.

5. In the fabrication of a laminated glass structure including two sheets of glass and an interposed layer of thermoplastic adherent thereto and extending beyond the edges of the glass sheets in a flexible attaching flange, the step of routing out a portion of the extended plastic attaching flange to form a channel in one side face thereof for the reception of a mounting means.

6. In the fabrication of a laminated glass structure including two sheets of glass and an interposed layer of thermoplastic adherent thereto and extending beyond the edges of the glass sheets in a flexible attaching flange, the step of routing out a portion of the extended plastic attaching flange by a mechanical cutting operation to form a channel in one side face thereof for the reception of a mounting means.

7. The method of fabricating a laminated glass structure including two sheets of glass and an interposed layer of thermoplastic adherent thereto and extending beyond the edges of the glass sheets, comprising assembling the glass sheets and thermoplastic to form a "sandwich," bonding the glass sheets to the plastic interlayer to form a composite structure, and then forming a channel in one side of the extended portion of the plastic for the reception of a mounting means.

8. The method set forth in claim 7 characterized by the fact that the channel in the extended portion of the plastic is formed by routing out a portion of the plastic by a mechanical cutting operation.

9. A laminated structure comprising two sheets of glass and an interposed layer of thermoplastic bonded to the glass sheets and extending beyond the edges thereof, plastic facing strips bonded to the opposite faces of the extended plastic and cooperating therewith to form a flexible attaching flange of a thickness substantially equal to the over-all thickness of the laminated structure, and a channel formed in one of said facing strips for the reception of a mounting means.

10. A laminated structure comprising two sheets of glass and an interposed layer of thermoplastic bonded to the glass sheets and extending beyond the edges thereof, and plastic facing strips bonded to the opposite faces of the extended plastic and cooperating therewith to form a flexible attaching flange of a thickness substantially equal to the over-all thickness of the laminated structure, said facing strips being formed of a plastic that is relatively harder than the plastic interlayer but less brittle than glass.

11. A laminated structure comprising two sheets of glass and an interposed layer of thermoplastic bonded to the glass sheets and extending beyond the edges thereof, plastic facing strips bonded to the opposite faces of the extended plastic and cooperating therewith to form a flexible attaching flange of a thickness substantially equal to the over-all thickness of the laminated structure, said facing strips being formed of a relatively harder plastic than the plastic interlayer, and a channel formed in one of said facing strips for the reception of a mounting means.

GEORGE B. WATKINS.